United States Patent
Palma

(10) Patent No.: US 9,845,030 B2
(45) Date of Patent: Dec. 19, 2017

(54) AUTOMOBILE VEHICLE HEADREST

(71) Applicant: Damaris Palma, Miami Springs, FL (US)

(72) Inventor: Damaris Palma, Miami Springs, FL (US)

( * ) Notice: Subject to any disclaimer, the term of this patent is extended or adjusted under 35 U.S.C. 154(b) by 0 days.

(21) Appl. No.: 14/754,748

(22) Filed: Jun. 30, 2015

(65) Prior Publication Data

US 2015/0375651 A1 Dec. 31, 2015

Related U.S. Application Data

(60) Provisional application No. 62/019,120, filed on Jun. 30, 2014.

(51) Int. Cl.
*B60N 2/48* (2006.01)
*B60N 2/28* (2006.01)

(52) U.S. Cl.
CPC ......... *B60N 2/4879* (2013.01); *B60N 2/2851* (2013.01); *B60N 2/482* (2013.01); *B60N 2/4882* (2013.01)

(58) Field of Classification Search
CPC .... B60N 2/482; B60N 2/4879; B60N 2/4808; B60N 2/4882; B60N 2/4891; B60N 2/4814; B60N 2/66; B60N 2/663; B60N 2/666; B60N 2/2851
See application file for complete search history.

(56) References Cited

U.S. PATENT DOCUMENTS

| | | | | |
|---|---|---|---|---|
| 5,101,811 A | * | 4/1992 | Brunswick | A47C 7/425 297/112 |
| 5,345,633 A | * | 9/1994 | Harnish | B60N 2/4879 224/579 |
| D359,192 S | * | 6/1995 | Franklin, III | D6/596 |
| 5,567,011 A | * | 10/1996 | Sessini | B60N 2/0232 297/284.4 |
| 5,964,504 A | * | 10/1999 | Hogan | B60N 2/4879 297/220 |
| 6,527,339 B2 | * | 3/2003 | Voris | B60N 2/2881 297/219.12 |
| 8,585,141 B2 | * | 11/2013 | Limpaitoon | A47C 7/425 297/230.1 |
| 2002/0043842 A1 | * | 4/2002 | Nakamori | A47C 7/46 297/284.5 |
| 2002/0185573 A1 | * | 12/2002 | Bisch | A47C 7/383 248/118 |
| 2006/0244299 A1 | * | 11/2006 | Snedeker | B60N 2/4882 297/393 |
| 2010/0237675 A1 | * | 9/2010 | Merritt | A47C 7/38 297/393 |
| 2012/0062013 A1 | * | 3/2012 | Weigert | B60N 2/4879 297/397 |
| 2013/0119716 A1 | * | 5/2013 | Stronconi | B60N 2/4805 297/180.1 |
| 2013/0320721 A1 | * | 12/2013 | Cortellazzi | B60N 2/6027 297/224 |

(Continued)

*Primary Examiner* — Timothy J Brindley
(74) *Attorney, Agent, or Firm* — Tucker Law, P.A.; Matthew Sean Tucker, Esq.

(57) ABSTRACT

A headrest device that integrates with vehicle's seats for providing persons with a device for resting ones head when traveling as a passenger in a vehicle, the headrest device including a headrest assembly that removably mates with a mount assembly.

15 Claims, 7 Drawing Sheets

(56) References Cited

U.S. PATENT DOCUMENTS

| | | | | |
|---|---|---|---|---|
| 2015/0020314 A1* | 1/2015 | Garcia | ............... | B60N 2/4879 |
| | | | | 5/636 |
| 2015/0182044 A1* | 7/2015 | Fan | ............... | A47G 9/1027 |
| | | | | 5/644 |
| 2015/0265062 A1* | 9/2015 | Blyberg | ............... | A47C 21/026 |
| | | | | 248/118 |
| 2016/0031351 A1* | 2/2016 | Galbreath | ............... | B60N 2/64 |
| | | | | 297/284.1 |
| 2016/0068086 A1* | 3/2016 | Gazit | ............... | B60N 2/4879 |
| | | | | 297/398 |
| 2016/0250954 A1* | 9/2016 | Gomez | ............... | B60N 2/4879 |
| 2016/0297336 A1* | 10/2016 | Suomi | ............... | B60N 2/4879 |

* cited by examiner

AUTOMOBILE VEHICLE HEADREST

CROSS-REFERENCE TO RELATED APPLICATION

This application is related to and claims benefit to U.S. Provisional Patent Application Ser. No. 62/019,120, filed Jun. 30, 2014, entitled Automobile Vehicle Headrest, the entirety of which is incorporated herein by reference.

FIELD OF THE INVENTION

The present invention relates to an automobile vehicle headrest, and more in particularly to an automobile headrest designed to attach with a passenger seat, the automobile headrest intended to receive a human head.

BACKGROUND OF THE INVENTION

A conventional seat in a vehicle having a seatback includes a headrest disposed at the top of the seatback thereof. The headrest is adjustable to account for different heights of people. In addition, the headrest may be shaped to maintain a person's head while driving in the vehicle. However, a child cannot take advantage of the benefits of the included headrest because the child's head does not reach the headrest.

It is very common for children to fall asleep during drives in a vehicle. Because children's heads rest against the seatbacks, it is common for the child's head to fall to the side, placing the child in an awkward sleep position resulting in soreness to the neck and back of the child.

There is a need in the art for a vehicle headrest for maintaining a child's head.

SUMMARY OF THE INVENTION

The present invention advantageously provides headrest device for securing against an existing motor vehicle seat.

According to an embodiment of the present invention, a principal object is to provide a headrest device that secures with one or more vehicle anchors.

According to an embodiment of the present invention, another object is to a headrest device that has a removable cover that operatively separates from the headrest assembly for cleaning and replacement thereof.

According to an embodiment of the present invention, another object is to a headrest device that secures with one or more of the headrest posts.

According to an embodiment of the present invention, another object is to provide a headrest device having a headrest assembly and a mount assembly, the headrest assembly removably secures with the mount assembly.

According to an embodiment of the present invention, another object is to provide a headrest assembly that is adjustable in relation to a mount assembly. In operation, the headrest is adjustable in a vertical direction in relation to the vehicle car seat for optimally positioning the headrest device for a user's head.

According to an embodiment of the present invention, the mount assembly optionally routed between a portion of the seat of the vehicle.

According to an embodiment of the present invention, the headrest assembly is configured to provide side support for a user's head to prevent their head from falling to the side while sitting and/or riding in a vehicle.

According to an embodiment of the present invention, the headrest device having a substantially cushioned portion shaped for receiving a head of a person. In a further embodiment, the cushioned portion shaped to maintain the head of a person that leans to the left or right while sitting in the chair. Operatively, side portions of the headrest receive a person's head allowing for the person to lean in their seat without placing their neck in a compromising position.

Other objects will become evident as the present invention is described in detail below.

BRIEF DESCRIPTION OF THE DRAWINGS

Embodiments of the present application are described herein in which similar elements are given similar reference characters, and a more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
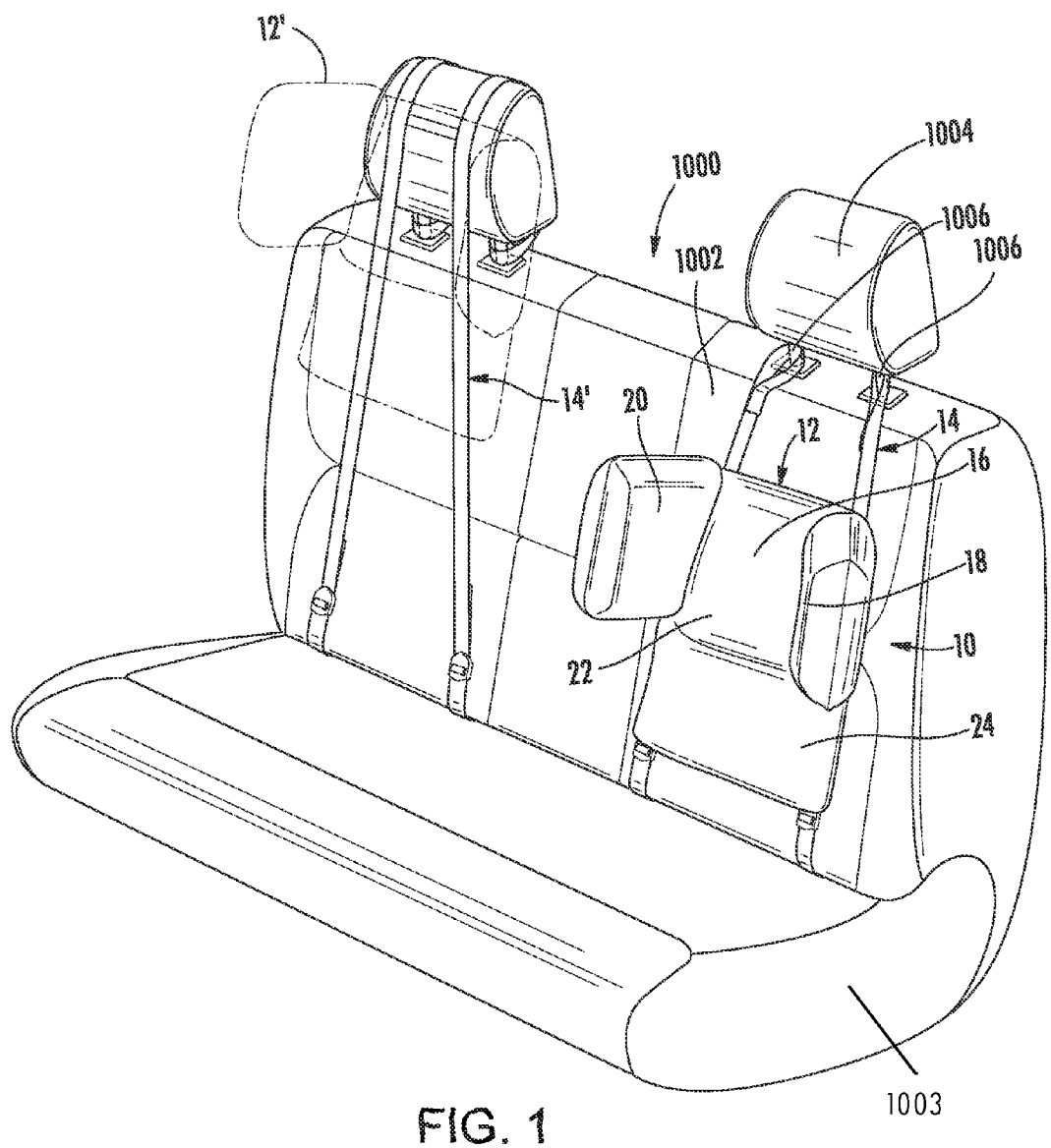
FIG. 1 is a perspective view of the headrest device for a vehicle seat in accordance with the principles of the present invention.

The present invention advantageously provides a headrest device that integrates with vehicle's seats. The present invention contemplates various types of headrests for integration with existing vehicles seats.

Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

Referring now to the drawing figures in which like reference designators refer to like elements. FIG. 1 shows an exemplary headrest device constructed in accordance with the principles of the present invention and designated generally as headrest device "10." In particular, headrest device 10 includes a headrest assembly 12 and a mount assembly 14. The headrest assembly 12 and the mount assembly 14 removably maintained with a vehicle seat 1000. The vehicle seat 1000 having a back portion 1002 and a bottom seat cushion 1003. The vehicle seat 1000 further including a vehicle headrest 1004, the headrest having one or more posts 1006.

The headrest assembly including a central portion 16 for receiving a person's head. The headrest assembly further including a left side wing portion 18 and a right side wing portion 20. The combination of the central portion, the left side wing portion 18, and the right side wing portion 20 forming substantially a u-shape or c-shape. In the embodiment of FIG. 1, the headrest assembly 12 having wing portions 18, 20 that extend outward laterally from the central portion 16. While the wing portions 18, 20 are depicted as extending linearly, it is not so required. The wing portions 18, 20 may each include curvature as the wing portions 18, 20 extend out and away from the central portion 16.

The headrest assembly including a cover 22. The cover 22 is configured to cover at least a portion of the central portion 16, and the wing portions 18, 20. In an embodiment, the cover 22 including a lower material 24 configured to be hung below the central portion 16. In one operation, the lower material 24 sandwiched between the user and the seat 1002. The cover 22 is intended to cover the headrest at least when a person's head, namely without exclusion a child's head, is resting against the headrest.

In an alternative arrangement, the mount assembly 14' is positioned over the vehicle headrest allowing the headrest assembly 12' to be positioned against the back portion 1002, the vehicle headrest 1004, or positioned to provide head support, including side support to prevent the user's head from falling to the sides, between the back portion 1002 and the vehicle headrest 1004, particularly suited for short individuals or adolescents that cannot reach the vehicle headrest 1004, illustrated by FIG. 1.

In yet another alternative arrangement (not shown explicitly shown in FIG. 1), the mount assembly 14' secures entirely around and/or about the vehicle headrest. This arrangement is particularly useful in vehicles that do not have anchors by which the mount assembly 14' would otherwise be able to attach. In this embodiment, the mount assembly 14' may secure to any portion of the headrest including wrapping around the headrest and securing to itself and/or the headrest posts, such as posts 1006.

Figure 2:
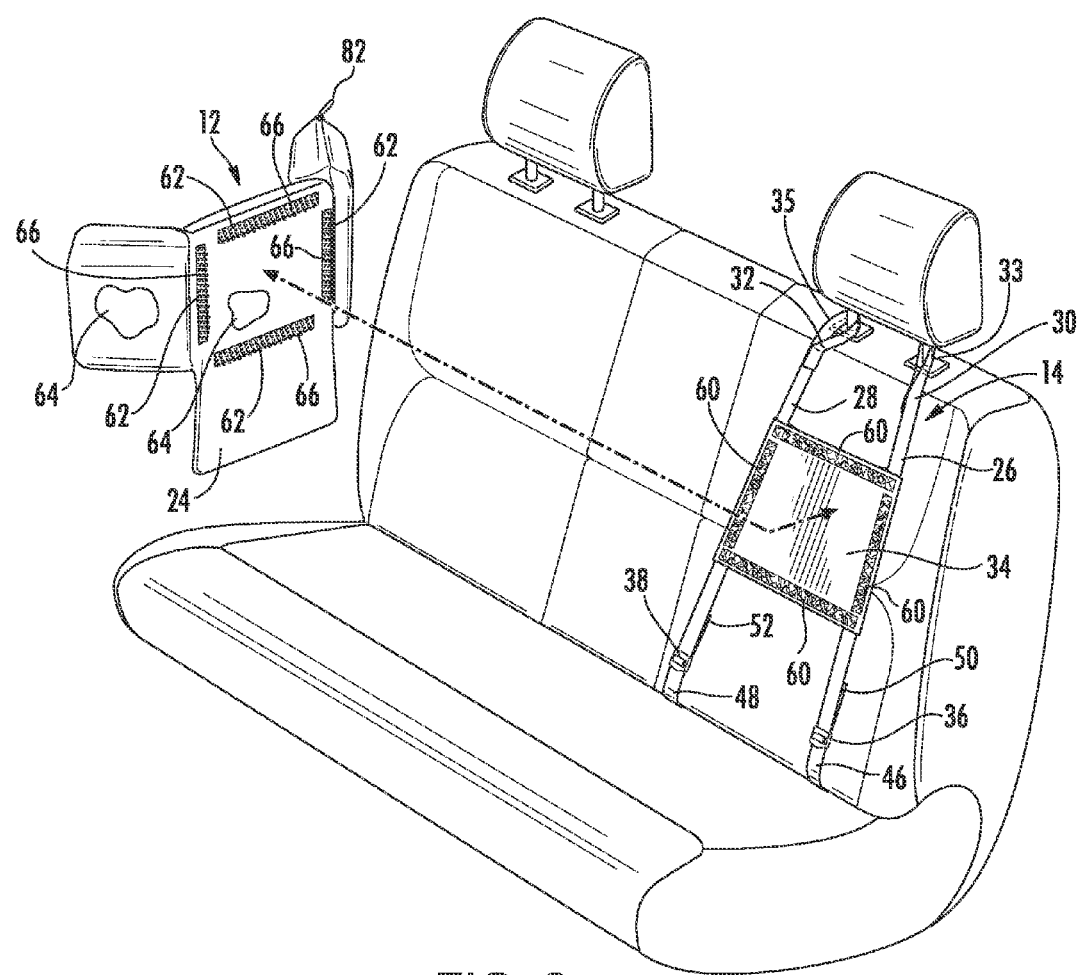
FIG. 2 is a an exploded view of the headrest device of FIG. 1 depicting attachment of the headrest assembly with the mount assembly in accordance with the principles of the present embodiment.

Referring now to FIG. 2, the mount assembly 14 is shown having a first and second mount straps 26, 28. In an embodiment, the mount straps 26, 28 are formed of stitching material. In an embodiment, the mount straps 26, 28 secured on one of their ends to buckles 36, 38 and secure on their other ends to vehicle posts 1006, vehicle headrest 1004, and/or vehicle anchors 80. In one nonexclusive embodiment, the mount straps preferably formed of polyester stitching. The first and second mount straps 26, 28 preferably are flexible.

Figure 4:
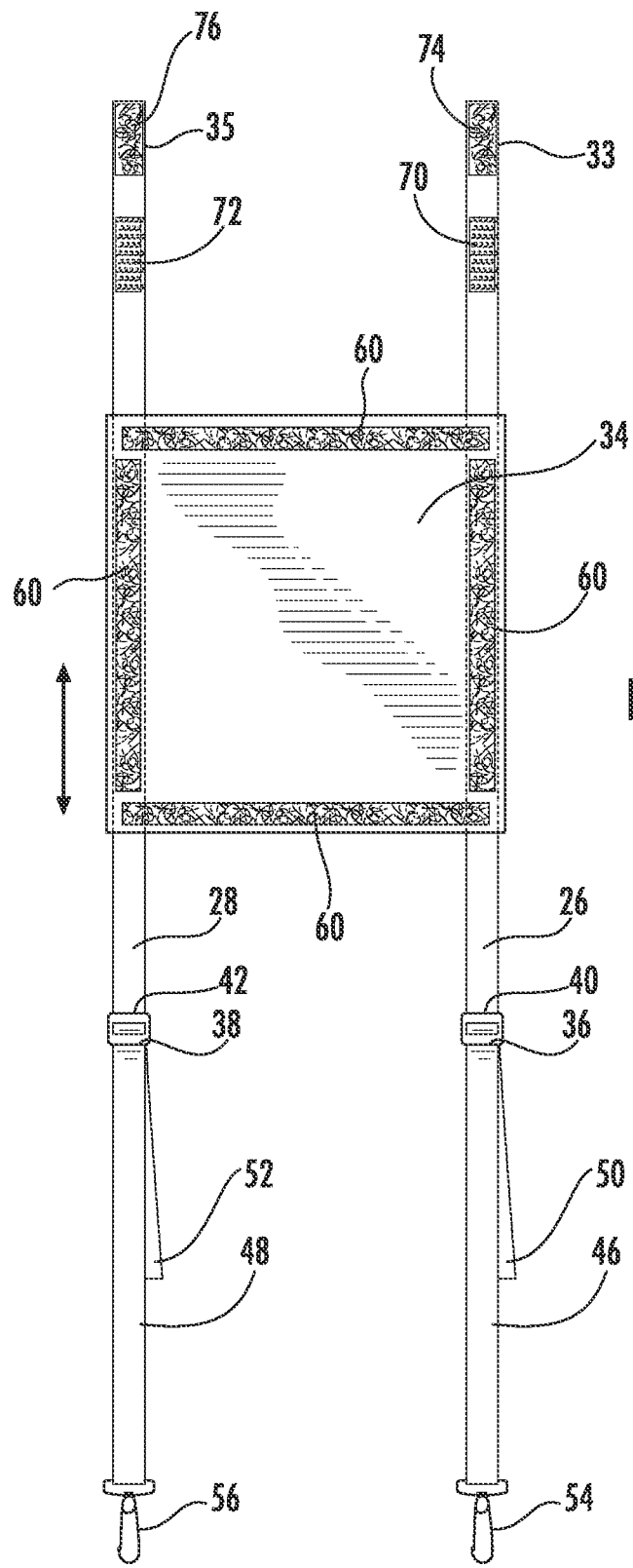
FIG. 4 is one view of the mount assembly in accordance with the principles of the present embodiment.

Referring to an embodiment shown in FIGS. 2 & 4, the first and second mount straps 26, 28 having upper portions 30, 32. The upper portions 30, 32 having upper fasteners 33, 35 each designed to secure about the one or more posts 1006 (FIGS. 1-2 depicting two posts 1006). In one exemplary embodiment, the upper fasteners 33, 35 each include a hook material 70, 72 and a reciprocating loop material 74, 76. However, the upper fasteners 33, 35 may include other fasteners, such as snap hooks, buckles, or other fasteners for securing the upper portions 30, 32 to a portion of the vehicle.

In an embodiment, the mount assembly 14 includes a headrest receiving portion 34 that is slidably disposed about the length of the straps 26, 28. In one embodiment, the headrest receiving portion 34 may route at least a portion of the straps 26, 28 therethrough.

The headrest receiving portion 34 may be adjustable along the length of the straps 26, 28, as depicted by the arrow shown in FIG. 4.

In an embodiment (not shown), the straps can proceed up and over the headrest and secure with the posts 1006, which allows the headrest device 10 to be optionally placed to provide head support for the space between the back portion 1002 and the vehicle headrest 1004.

In an embodiment, the headrest receiving portion 34 may be locked in place about the straps 26, 28. The headrest receiving portion 34 and/or the straps 26, 28 may include a locking mechanism (not shown) for releasably locking the headrest receiving portion 34 about the straps 26, 28.

The mount assembly 14 including first and second tension buckles 36, 38. The first and second tension buckles 36, 38 receiving and maintaining a portion of the straps 26, 28, preferably without exclusion, the ends 40, 42 thereof. The mount assembly further including first and second tension straps 46, 48. The tension straps 46, 48 routing through, or otherwise disposed with, the tension buckles 36, 38, respectively. The tensions straps coupled with lower fasteners 54, 56. As illustrated in the FIGS. 1-3, the tension straps 46, 48 are led through the back portion 1002 and the bottom seat cushion 1003 to join with an anchor of the vehicle.

The headrest receiving portion 34 includes fastening members 60. In the embodiment shown in FIG. 2, hook and loop 60 material is shown as the fastening members. The headrest assembly 12 including a base portion 64. The base portion maintaining fastening members 62. In the embodiment shown in FIG. 2, the fastening members 62 is formed of hook and loop material 62. The head rest assembly is disposed against the headrest receiving portion 34 by way of reciprocating fastening members 60, 62. In the instant embodiment, the reciprocating fastening members 60, 62 are formed of hook and loop material, however, any other fastener, such as snap lock buttons, zippers, or the like, may be implemented within the spirit and the scope of the present invention. The cover 22 including apertures 66, the apertures 66 configured to allow the fasteners 62 disposed about the base 64 to project through the cover for mating with fasteners 60 in a reciprocating arrangement.

The tension straps 46, 48 each having ends 50, 52, which may receive tension from a user for causing tension to the mount assembly 14.

Figure 3:
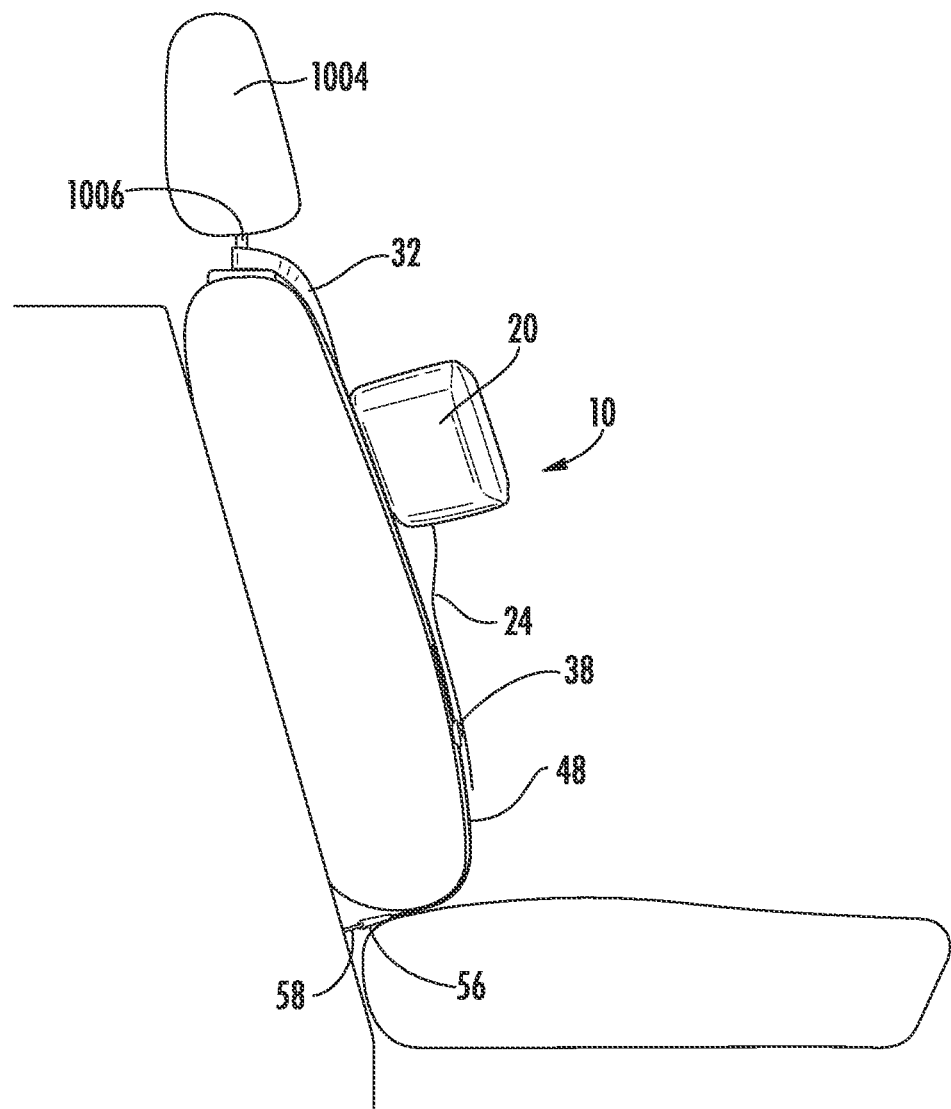
FIG. 3 is a side view of the headrest device in accordance with the principles of the present embodiment.

Referring now to an embodiment shown in FIG. 3, the vehicle includes a plurality of lower anchors 58. The lower fasteners 54, 56 securing with one or more of the lower anchors 58. In operation, according to FIGS. 2-3, the user can apply tension to the straps 26, 28 by applying tension to the tension straps 46, 48 and causing the tension straps to route through the tension buckles 36, 38 for increasing tension thereof. In one embodiment, the mount assembly 14 may be secured taut between one or more of the posts 1006 and one or more of the lower anchors 58 or any other vehicle anchors. The tension straps, or any other portion of the mount assembly 14, capable of causing a tightened fit of the mount assembly 14 with the vehicle seat for preventing movement of the mount assembly 14 thereof is within the spirit and scope of the present invention.

Figure 5:
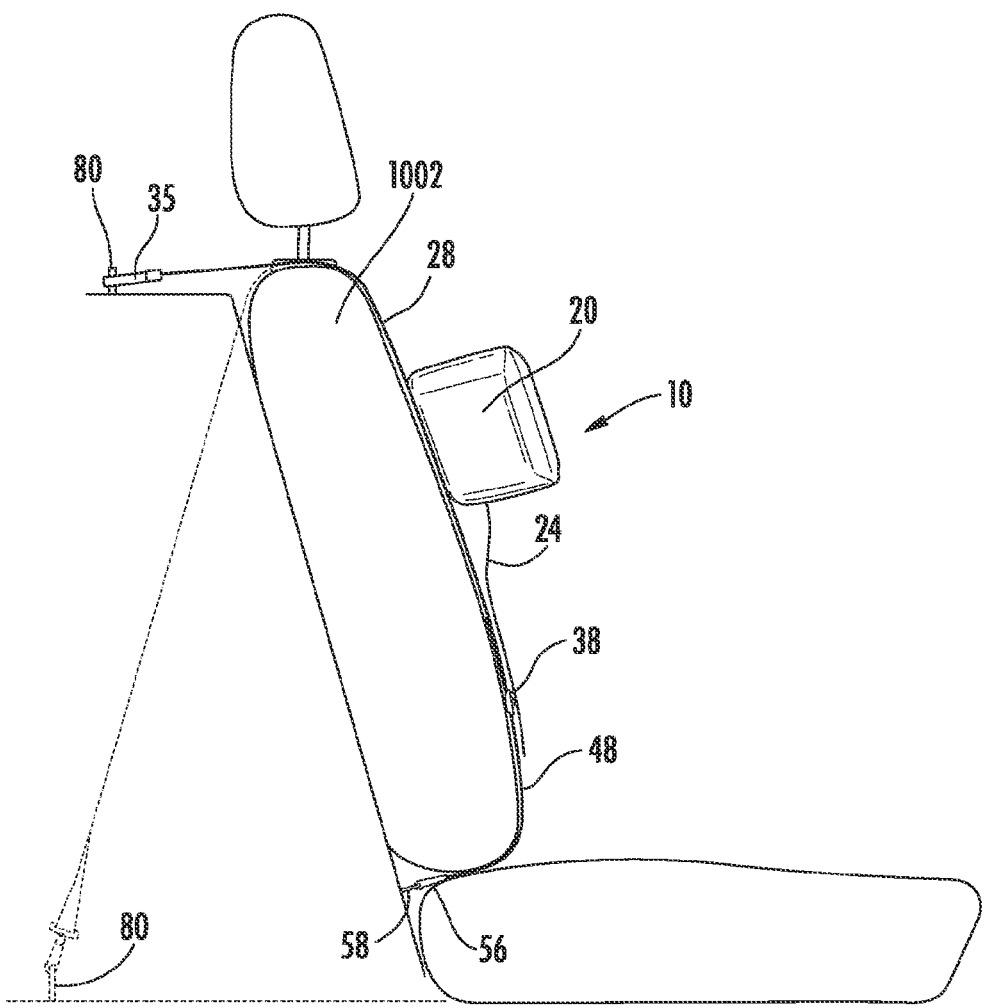
FIG. 5 is a side view of the headrest device having the mount assembly attached to upper and lower vehicle anchors in accordance with the principles of the present embodiment.

Referring to an alternative non-exclusive exemplary embodiment shown in FIG. 5, upper fasteners 33, 35 mate with one or more vehicle anchors 80. In this embodiment, the upper fasteners 33, 35 may include any type of fastener configured to secure with one or more vehicle anchors 80.

Upper fasteners 33, 35 may include without limitation hook and loop material, snap locks, buckles, hooks, carabiners, and the like.

Figure 6:
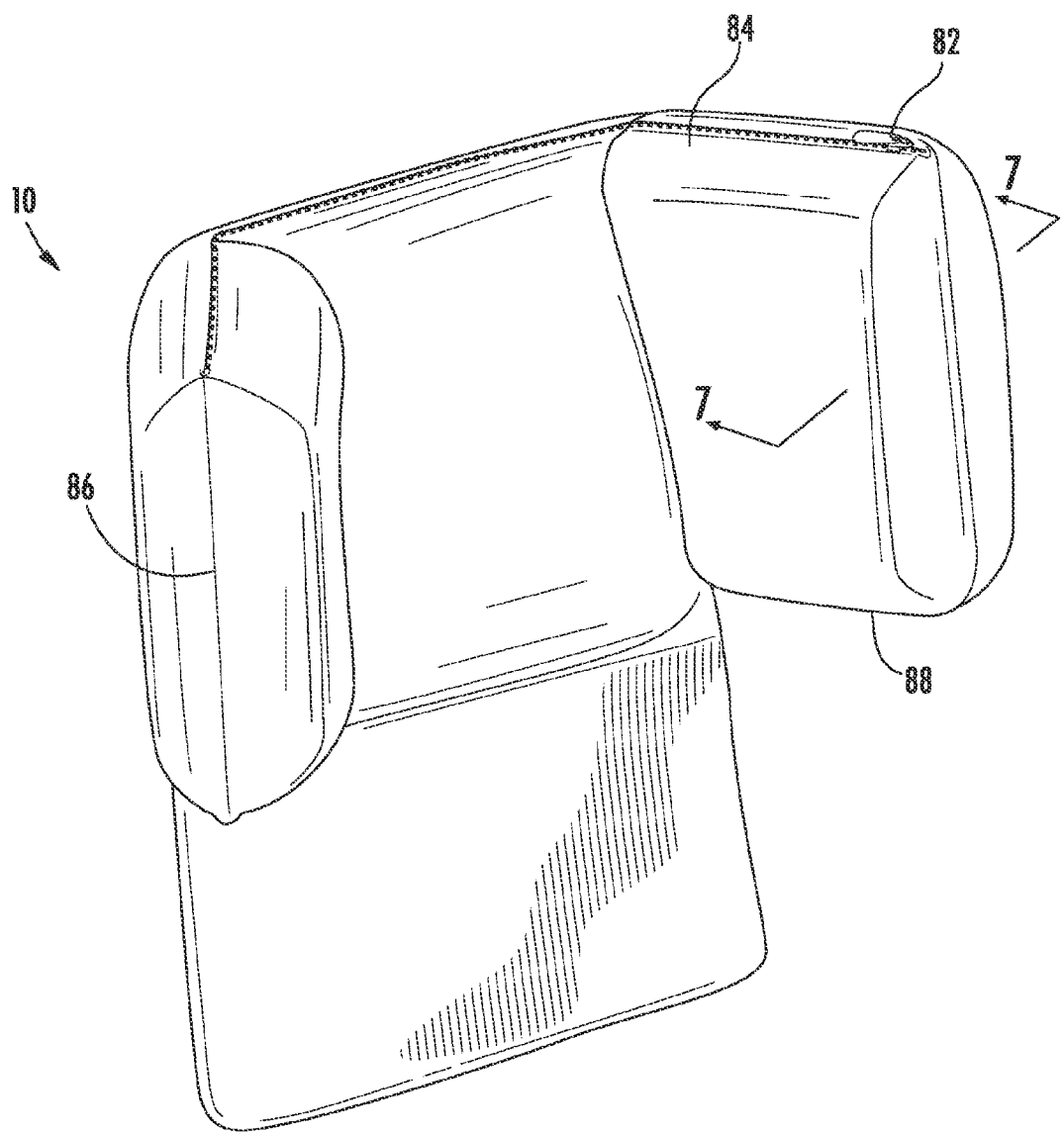
FIG. 6 is a perspective view of the headrest device having an enclosure portion in accordance with the principles of the present embodiment.

Referring now to FIG. 6, the cover 22 is shown having a closure member 82. The closure member 82 particular illustrates a zipper disposed along the upper portion 84 of the headrest assembly. However, any other type of closure member is within the spirit and scope of the present embodiment. For example, hook and loop material, buttons, snap locks, magnetic locks, and like closure members may be implemented as the closure member. Additionally, while the closure member 82 is illustrated along the upper portion 84 of the cover 22, the closure member 82 may be implemented, without limitation, along the side edge portion 86 of the cover 22, and/or along a lower portion 88 of the cover 22. The closure member 82 opens for allowing removal of the cover from the headrest assembly 12. In operation, a person can remove the cover 22 for cleaning and replace the cover 22 thereof.

Figure 7:
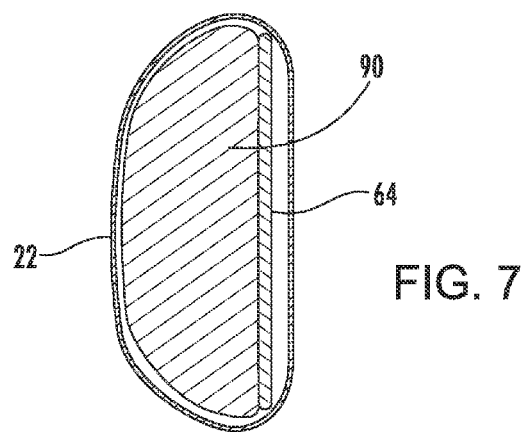
FIG. 7 is a cross-sectional view along line 7-7 of FIG. 6 in accordance with the principles of the present embodiment.

Referring now to FIG. 7 is a cross-sectional view of FIG. 6 taken along line 7-7. The cross sectional view illustrates one embodiment of the relationship of the cover 22 with the contents maintained therein. In particular, is shown the base portion 64 coupled with cushion member 90. The cushion member 90 providing a padded barrier between the user and the base 64. The cushion member 90 disposed either removably or permanently against the base 64. The cover 22 covering the base 64 and the cushion member 90. The base 64 may be provided to maintain the shape of the headrest assembly. The base 64 may be formed of plastic, cardboard, metal, or other rigid or semi-rigid materials.

Figure 8:
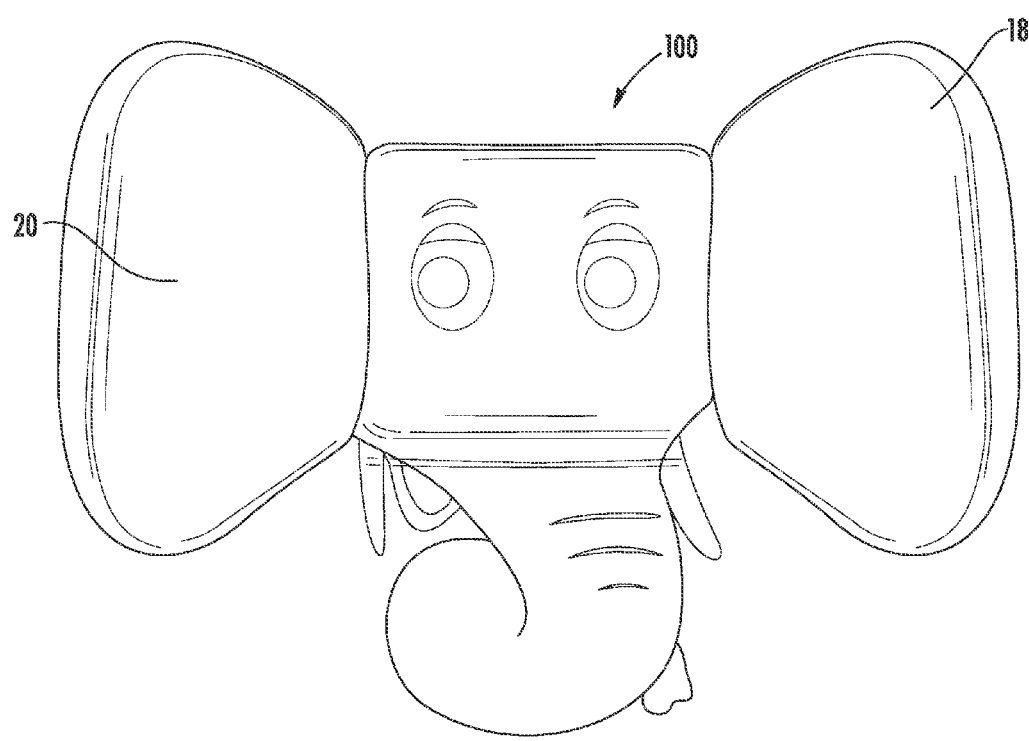
FIG. 8 is front view of the headrest assembly shaped into a character in accordance with the principles of the present embodiment.

Referring now to FIG. 8, an exemplary embodiment is shown of a non-exclusive embodiment of a headrest assembly 12 shaped into a character. The base portion 64 may be shaped and formed to be perceived as ears by persons. In a particular embodiment, the left and right wing portion 18, 20 may be shaped into ears, wings (such as the wings of a butterfly), tires (for cars or other motor vehicles), and other desired shapes.

Still referring to FIG. 8, the headrest assembly 12 having a base portion 64, cushion member 90, and cover 22, the headrest assembly 12 is shaped into an elephant having elephant ears. The left and right wing portions 18, 20 shaped into elephant ears.

Alternative shapes of the headrest assembly may implemented into any desirable character shape, such as a world famous mouse, a goofy looking character, a bear that eats honey, or other famous characters, including characters commonly seen in theme parks.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are contemplated in light of the above teachings without departing from the scope and spirit of the invention. It will be readily apparent that various changes may be made thereto without departing from the spirit and scope of the disclosure or sacrificing all of its material advantages. The examples and embodiments described herein are merely exemplary of the instant disclosure, and any variation of features may be combined together to form the invention.

What is claimed is:

1. A headrest adapted for use in conjunction with a passenger seat in a motor vehicle, said headrest comprising:
   a head cushion;
   a strap assembly having at least one strap having a first distal end and a second distal end, said strap assembly capable of holding said head cushion below an existing vehicle headrest, said at least one strap attachable on said first distal end to a vehicle anchor and said at least one strap attachable on said second distal end to an existing vehicle seat headrest post;
   wherein each of said plurality of straps further comprises a first strap portion having first length and a second strap portion having a second length, said first strap portion having a first proximal end and said first distal end, said second strap portion having a second proximal end and said second distal end, a strap receiving member configured to secure together said first strap portion and second strap portion;
   wherein at least of one said first strap portion and said second strap portion are manipulable to adjust the overall measurable length between said first distal end and said second distal end; and
   further comprising a mount assembly facilitating cooperation between said strap assembly and said head cushion, wherein the position of said mount assembly along said strap is slidably adjustable.

2. The headrest of claim 1, further comprising a pair of side head cushions extending from said head cushion.

3. The headrest of claim 2, wherein said pair of side head cushions adapted to maintain the head of a passenger from falling to the side during a car ride.

4. The headrest of claim 1, further comprising a cover surrounding about at least a portion of said head cushion.

5. The headrest of claim 4, further comprising at least one attachment member for securing said head cushion to said strap assembly, wherein said cover includes at least one opening for exposing said attachment member.

6. The headrest of claim 5, wherein said attachment member defining reciprocating hook and loop material.

7. A vehicle headrest unit for use in a vehicle having a seat, the seat defining a backrest portion, said vehicle headrest unit comprising:
   a strap assembly having at least one strap having a first distal end and a second distal end, said at least one strap attachable on said first distal end to a vehicle anchor and said at least one strap attachable on said second distal end to an existing vehicle seat headrest post; and
   an adjustable headrest defining a central head cushion portion and a pair of forward extending side cushion portions extending from said central cushion portion, said adjustable headrest configured to receive a head of a person, said headrest having a back portion removably securable about said strap assembly;
   wherein each of said strap further defining a first strap portion having first length and a second strap portion having a second length, said first strap portion having a first proximal end and said first distal end, said second strap portion having a second proximal end and said second distal end, a strap receiving member configured to secure together said first strap portion and said second strap portion; and
   further comprising a mount assembly slidably disposed about the length of said strap assembly.

8. The vehicle headrest unit of claim 7, wherein said headrest is removability securable about a length of said strap assembly.

9. The vehicle headrest unit of claim 7, wherein said mount assembly facilitates securement of said adjustable headrest about said strap assembly.

10. The vehicle headrest unit of claim 9, wherein said mount assembly and said adjustable headrest each further include reciprocating hook and loop material for facilitating securement of said adjustable headrest about said strap assembly.

11. The vehicle headrest unit of claim 10, wherein said reciprocating hook and loop material is positioned about a peripheral edge of said mount assembly.

12. The vehicle headrest unit of claim 7, wherein said forward extending side cushion portions are shaped to resemble ears.

13. The vehicle headrest of claim 7, wherein said adjustable headrest further having a replaceable washable cover.

14. The vehicle headrest of claim 7, wherein at least of one said first strap portion and said second strap portion are manipulated to adjust the overall measurable length between said first distal end and said second distal end.

15. A vehicle headrest unit for use for children and persons who are not tall enough to rest their head against the existing vehicle headrest in a vehicle, said vehicle headrest unit comprising:
   a strap assembly having at least one strap, each strap defining a first strap portion having first length and a second strap portion having a second length, a buckle portion for securing each of said first strap portion and said second strap portion together, said first strap portion securable to a vehicle anchor and said second strap portion to a portion of an existing vehicle headrest, wherein the existing vehicle headrest includes at least the head cushion and at least one headrest post;
   an adjustable headrest having a cushion, said cushion defining a central head cushion portion and a pair of forward extending side cushion portions extending from said central cushion portion, said adjustable headrest configured to support the head of a person, said headrest further including a replaceable washable sanitary cover around at least a portion of said cushion; and
   a mount assembly slidably disposed about said strap assembly, wherein said mount assembly facilitates securement of said adjustable headrest about said strap assembly via reciprocating hook and loop material, said reciprocating hook and loop material positioned about a peripheral edge of said mount assembly.

* * * * *